United States Patent
Bevan

(10) Patent No.: US 10,338,204 B2
(45) Date of Patent: Jul. 2, 2019

(54) SENSOR SYSTEMS

(71) Applicant: Heba Bevan, Cambridge (GB)

(72) Inventor: Heba Bevan, Cambridge (GB)

(*) Notice: Subject to any disclaimer, the term of this patent is extended or adjusted under 35 U.S.C. 154(b) by 208 days.

(21) Appl. No.: 15/505,484

(22) PCT Filed: Aug. 21, 2015

(86) PCT No.: PCT/GB2015/052439
§ 371 (c)(1),
(2) Date: Feb. 21, 2017

(87) PCT Pub. No.: WO2016/027104
PCT Pub. Date: Feb. 25, 2016

(65) Prior Publication Data
US 2017/0242114 A1    Aug. 24, 2017

(30) Foreign Application Priority Data
Aug. 22, 2014    (GB) .................................. 1414975.1

(51) Int. Cl.
*G01S 11/06*    (2006.01)
*G01S 11/04*    (2006.01)
(Continued)

(52) U.S. Cl.
CPC ............... *G01S 11/06* (2013.01); *G01S 11/04* (2013.01); *G01S 13/46* (2013.01); *G01S 13/765* (2013.01);
(Continued)

(58) Field of Classification Search
CPC . G01S 11/04; G01S 1/06; G01S 13/46; G01S 13/765
(Continued)

(56) References Cited

U.S. PATENT DOCUMENTS

2009/0033545 A1    2/2009    Pilcher, Jr.
2010/0321245 A1    12/2010    Aoki
(Continued)

OTHER PUBLICATIONS

International Search Report and Written Opinion for corresponding International Application No. PCT/GB2015/052439 dated Dec. 4, 2015.
(Continued)

*Primary Examiner* — Congvan Tran
(74) *Attorney, Agent, or Firm* — Renner, Otto, Boisselle & Sklar, LLP

(57) ABSTRACT

We describe a sensor system for measuring relative distance between sensors of the system, the sensor system comprising at least two sensors, wherein each said sensor comprises an RF transceiver coupled to a microprocessor and stored program code for controlling the microprocessor, wherein said stored program code comprises code to: send, using said RF transceiver a group of one or more data bits from the sensor to a second sensor; receive, using said RF transceiver, an acknowledgement of reception of said group of data bits from said second sensor; determine a time difference between said sending and said receiving; compensate said time difference from a processing delay by the microprocessor of said second sensor between the second sensor receiving said group of data bits and sending said acknowledgement, to determine timing data reprinting distance to said second sensor.

13 Claims, 4 Drawing Sheets

(51) Int. Cl.
  *G01S 13/46* (2006.01)
  *G01S 13/76* (2006.01)
  *G01S 13/82* (2006.01)
  *G01S 13/84* (2006.01)
  *G01S 13/86* (2006.01)
  *G01S 13/87* (2006.01)
  *G01S 13/42* (2006.01)

(52) U.S. Cl.
  CPC ............ *G01S 13/825* (2013.01); *G01S 13/84* (2013.01); *G01S 13/86* (2013.01); *G01S 13/876* (2013.01); *G01S 13/878* (2013.01); *G01S 13/42* (2013.01); *G01S 2013/466* (2013.01)

(58) Field of Classification Search
  USPC ............... 455/404.2, 556.1, 456.1–456.2
  See application file for complete search history.

(56) References Cited

U.S. PATENT DOCUMENTS

| | | | | |
|---|---|---|---|---|
| 2014/0141801 | A1* | 5/2014 | Kummetz | G01S 5/0289 455/456.1 |
| 2015/0320339 | A1* | 11/2015 | Larson | A61B 5/1113 600/595 |
| 2015/0334580 | A1* | 11/2015 | Niskanen | H04L 12/12 370/252 |

OTHER PUBLICATIONS

Hui Liu et al., "Survey of Wireless Indoor Positioning Techniques and Systems", IEEE Transactions on Systems, Man, and Cybernetics: Part C: Applications and Reviews, IEEE Service Center, Piscataway, NJ, US, vol. 37, No. 6, Nov. 1, 2007, pp. 1067-1080 XP011193920.

P. Gulden et al., "Wireless local positioning", IEEE Magazine, IEEE Service Center, Piscataway, NJ, US, vol. 4, No. 4, Dec. 1, 2003, pp. 77-86, XP011107180.

Robert Meisen et al., "Where is the Tag?", IEEE Magazine, IEEE Service Center, Piscataway, NJ, US, vol. 12, No. 7, Dec. 1, 2011, pp. S49-S63, XP011380348.

Hui Liu et al., "Survey of Wireless Indoor Positioning Techniques and Systems", IEEE Transactions on Systems, Man, and Cybernetics: Part C: Applications and Reviews, IEEE Service Center, Piscataway, NJ, US, vol. 37, No. 6, Nov. 1, 2007, pp. 1067-1080 XP011193920 (previously listed on IDS submitted on Feb. 21, 2017).

P. Gulden et al., "Wireless local positioning", IEEE Magazine, IEEE Service Center, Piscataway, NJ, US, vol. 4, No. 4, Dec. 1, 2003, pp. 77-86, XP011107180 (previously listed on IDS submitted on Feb. 21, 2017).

Robert Meisen et al., "Where is the Tag?", IEEE Magazine, IEEE Service Center, Piscataway, NJ, US, vol. 12, No. 7, Dec. 1, 2011, pp. S49-S63, XP011380348 (previously listed on IDS submitted on Feb. 21, 2017).

* cited by examiner

SENSOR SYSTEMS

FIELD OF THE INVENTION

This invention relates to systems, methods and computer program code for groups of sensors. Applications of embodiments of the invention include instrumentation of civil engineering projects such as tunnels with swarms of sensors to determine relative motion of different portions of the structure.

BACKGROUND TO THE INVENTION

Typical sensors for monitoring, for example, civil engineering structures tend to be large and bulky devices, in part driven by the need for a useful length of battery life. This in turn generally means that relatively few sensors are deployed. Hitherto approaches to improving sensors of this type have focused on improving the accelerometer technology used for position determination. However the inventor has recognised that a paradigm shift is possible in the way this problem is approached.

SUMMARY OF THE INVENTION

According to the present invention there is therefore provided a sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to: send, using said RF transceiver, a group of one or more data bits from the sensor to a second sensor; receive, using said RF transceiver, an acknowledgement of reception of said group of data bits from said second sensor; determine a time difference between said sending and said receiving; and compensate said time difference for a processing delay by the microprocessor of said second sensor between the second sensor receiving said group of data bits and sending said acknowledgement, to determine timing data representing a distance to said second sensor.

Further features and aspects of the invention are set out in the dependent claims.

BRIEF DESCRIPTION OF THE DRAWINGS

These, and other aspects of the invention, will now be described, by way of further example, with reference to the accompanying figures, in which.

DETAILED DESCRIPTION OF PREFERRED EMBODIMENTS

The inventor has recognised that if the power consumption of an individual sensor can be reduced, the sensor size can also be reduced and it becomes practical to deploy many more sensors. This in turn means that the wireless transmission range requirements may be reduced and also facilitates more accurate position monitoring, in part because positions may be monitored over a finer mesh of locations, but also because, in principle, the ability of one sensor to measure distances to multiple other sensors can be used as the basis for improved reliability in determining when one sensor has moved relative to the others.

Figure 1:
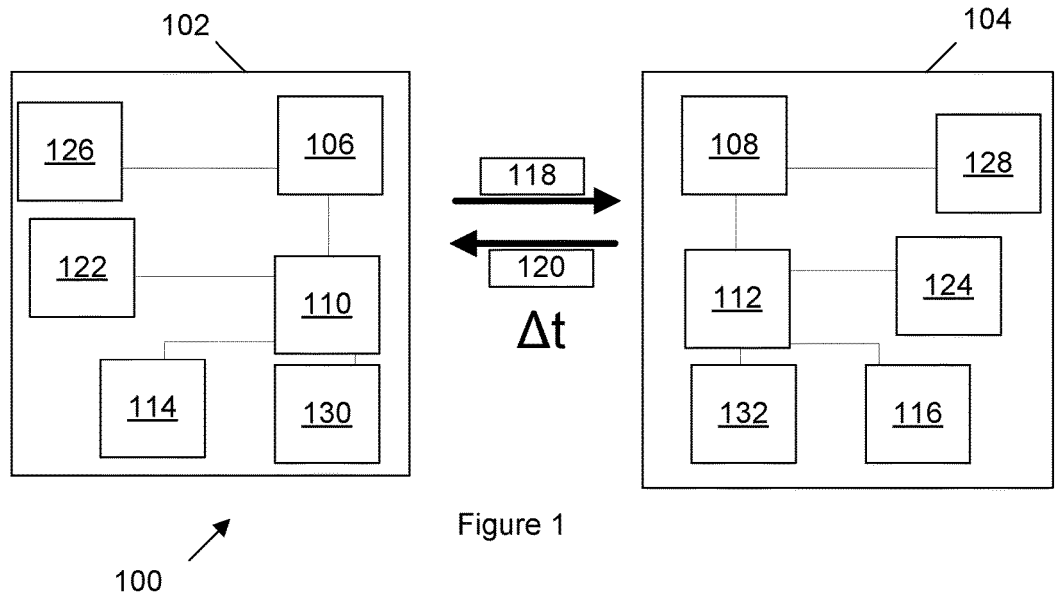
FIG. 1 shows a schematic of a sensor system according to embodiments of the present invention.

FIG. 1 shows a sensor system 100 for measuring relative distance between at least two sensors 102,104. Each sensor comprises an RF transceiver 106,108 coupled to a microprocessor 110,112, and stored program code 114,116.

Each sensor 102, 104 (node) may comprise an associated node identifier 126, 128, which will be further described below.

Each sensor 102, 104 may comprise an accelerometer and/or inclinometer 130, 132 which may be used, for example, to check/confirm that other distance data derived from timing and/or signal strength is correct, as will be further described below.

In some embodiments, each sensor 102,104 may comprise real time clocks 122,124, which may be on-chip microprocessor real time clocks, as will be further described below.

Figure 2:
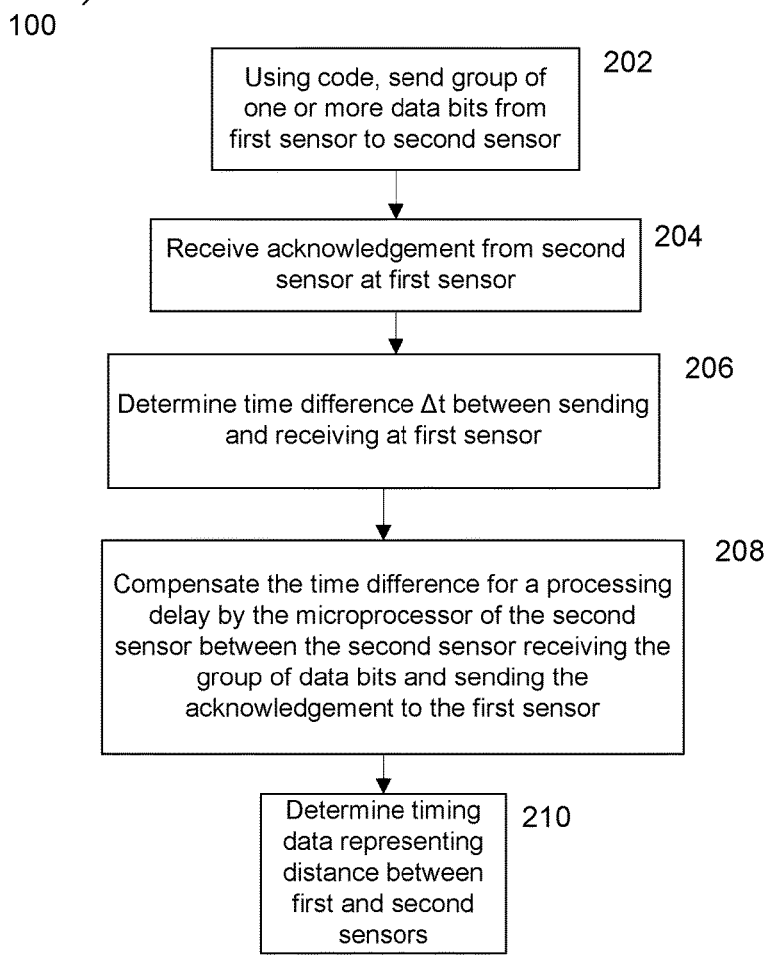
FIG. 2 shows a flowchart for determining timing data representing a distance between sensors according to embodiments of the present invention.

As shown in the flowchart of FIG. 2, the code 114,116 is configured to send a group of one or more data bits 118 from one sensor to another sensor (step 202); receive an acknowledgement 120 back (step 204); and determine a time difference Δt between said sending and said receiving (step 206). More particularly the code compensates the time difference for a processing delay by the microprocessor of the second sensor between the second sensor receiving the group of data bits and sending the acknowledgement (step 208), to determine timing data representing a distance to the second sensor (step 210). It will be appreciated that as the processing delay by the microprocessor in the second sensor is known, steps 206 and 208 may be exchanged or performed essentially simultaneously.

In embodiments of the sensor system, very surprisingly a microprocessor clock can be used to determine a sensor position based upon round trip timing of a signal (or potentially even one-way timing, with synchronised sensor clocks). This is surprising because it is generally desirable to be able to determine a sensor location with an accuracy of order 1 mm, say less than 50 mm or less than 10 mm, and a microprocessor clock would not be expected to deliver such accuracy in timing (light takes approximately 10 ps to travel 3 mm). This difficulty is compounded because the skilled person would know that a typical microprocessor has complex, quasi non-deterministic internal housekeeping actions which can affect timing accuracy.

To address this latter issue, in some preferred embodiments the code controlling the microprocessor of the second sensor may deliberately include superfluous code operating on the received data bits prior to sending an acknowledgement back to the first sensor. The precise instructions employed are not important but that instructions are performed tends to reduce quasi non-deterministic effects.

When determining distance based on round trip time the total number of instruction cycles performed by the microprocessor of the second sensor can be added up by examining the relevant machine code and then used to compensate the round trip timing.

It is preferable when determining the instructions implemented at the second node to define these in assembly language/machine code (or at least to check any compiled code) since it is important that each sensor used the same instructions, registers and the like (which can be defined in machine code). One example set of instructions comprises instructions to read a received bit from an input, write the bit into a register, read the bit from the register, and then to send the acknowledgement back. In other embodiments, however, more complex instructions may be employed. However the instructions should have a defined number of CPU cycles which is always the same.

In embodiments another strategy which can be advantageously employed is to send multiple groups of data bits of different lengths—for example two or more of a single bit, a bite, a word, and a long word. Timings from these multiple groups of data bits can then be combined, for example by averaging. This also helps to increase overall accuracy. The skilled person will appreciate that when multiple data bits are sent a consistent timing point should be established, for example based on the known time to execute a send instruction; and likewise for receiving. In embodiments the round-trip time may be determined by determining the difference between a bit/bite/double word send time and bit/bite/word/double word receive time, more particularly acknowledgement receive time based on times determined from a clock associated with the processor, typically an on-board clock of the microprocessor chip.

Surprisingly it has been found that the round-trip timing accuracy varies depending upon the length of the group of bits—the timing of a longer group appears more accurate than that of a single bit and sending a byte or word is therefore preferable in some embodiments.

As previously mentioned, in embodiments a sensor measures a set of round-trip times, for example 100 round-trip times, and takes an average. In some preferred embodiments after one or a group of bits/bites/words has been sent here is a delay to allow microprocessor of the second sensor to clear its registers and idle—without this the microprocessor of the second sensor can add an unpredictable number of additional cycles. In one embodiment a delay of order 1 second is allowed to reduce the risk of timing disruption by internal housekeeping.

In some embodiments accurate timing/distance measurements have been found possible by synchronising real time clocks 122, 124 in respective sensors (in embodiments on-chip microprocessor real time clocks which are then used to measure absolute times from which round trip times are determined.

In some preferred embodiments a pair of sensors is calibrated in a laboratory by implementing a set of instructions to, for example, load a bit into a register, read out the bit, send the bit, and receive an acknowledgement. With such an approach the number of CPU cycles for each sensor can be determined (the skilled person will appreciate that there are many ways to determine the number of cycles needed) and, preferably, the small radio delay can be calibrated out. In embodiments the sensors may all have the same type of microprocessor and relevant code portion and thus one calibration may suffice for a set of sensors.

The skilled person will appreciate that when determining a distance between two sensors the round trip time should be halved.

More generally, in preferred embodiments many round trip times (between sending the data bits and receiving acknowledgement) are averaged, for example more than 10, 50 or 100 such times.

Embodiments of the sensor system may include one or more sensors with a system to measure changes in distance based on changes in relative received signal phase. This approach may be used in combination with the above described distance measuring technique, or independently of the above described technique—sensors in the system may all be phase-based, or all timing-based, or comprising some (or all) sensors employing both signal phase and timing for distance measurement.

Thus in particular in embodiments a sensor for the system may comprise at least two RF receivers (for phase determination) and a microprocessor. F signals received by the receivers may be combined (in particular in the RF domain), to determine a relative phase difference between the signals. A change in this phase difference, for example because of a change in distance between the sensors, results in a change in this phase difference (for example, moving the sensors apart will increase the phase difference). By measuring this change in phase, in embodiments using the microprocessor under control of stored program code, a change in separation of the sensor from another said sensor is determined from the change in phase difference.

As the skilled person will appreciate, distance and phase are generally related by phase angle $\theta° = 360°.f.\Delta t$ where $\Delta t$ is effectively a measure of distance given the speed of propagation of the RF signal (which may vary depending upon temperature—see later).

In some embodiments, preferably (but not essentially) each sensor includes two RF transceivers operating on the same frequency. One sensor transmits two signals at the same frequency, preferably but not essentially using two separate transceivers. At a receiving sensor each of two receivers (transceivers) receives a combination of both transmitted signals. The outputs of the two receivers are combined/compared to determine a phase difference between these received signals. A reference value is established for this phase difference and then changes from this reference value are determined, which translate to a change in distance (and or, potentially, orientation) between the two sensors. In embodiments each sensor may have n transceivers, where n=1, 2, 3 or more; in embodiments one or transceivers operate in each of two or more frequency bands, for example 800-900 MHz and 2.4 GHz.

Optionally each receiver of a sensor may include a respective transmitter, to forward the received RF signal to a third sensor. The third sensor has RF receivers (transceivers) which operate as described above. Thus in effect a change in distance between a first and third sensor may be measured by forwarding the received RF signals at an intermediate node or sensor—at the intermediate node each of two receivers receives and re-transmits the received signals to the third sensor, at which the change-in-distance determination is made. This makes the system insensitive to changes in relative position of the start and end points (first and third sensors) perpendicular to a line between the sensors along which the change in (longitudinal) distance is measured. In a mesh of sensors a plurality of groups of three sensors may be created in such a manner, for increased accuracy of distance determination.

A change in distance in a direction perpendicular to a line joining two sensors can be found by integrating data from an accelerometer. This in turn can be used to determine an angle subtended at a first sensor between start and end positions of such perpendicular movement by a second sensor.

The skilled person will appreciate that in variants of the above described system one sensor may determine the direction of one or more other sensors. Thus again a set of directions defines relative locations of the sensors (and a reference or measured distance may be employed to define a scale for the system). Thus sensors may determine the location(s) of other sensors based on one or both of measured distances and directions to other sensors.

In particular embodiments a sensor (either as described herein or without the features described herein) may include a plurality of accelerometers to allow the sensor to determine a direction of gravity. In particular 3 accelerometers may be employed aligned along each of mutually orthogonal x- y- and z-axes. Such an arrangement allows the direction of gravity, and hence the orientation of a sensor to be determined—subject to an indeterminacy as to which way up the sensor is. This indeterminacy may either be resolved at installation (the installer installs the sensor a particular way up), or by employing 6 accelerometers this may automatically be resolved. When a sensor orientation is known, one or more directions of other sensors may be determined.

Figure 3:
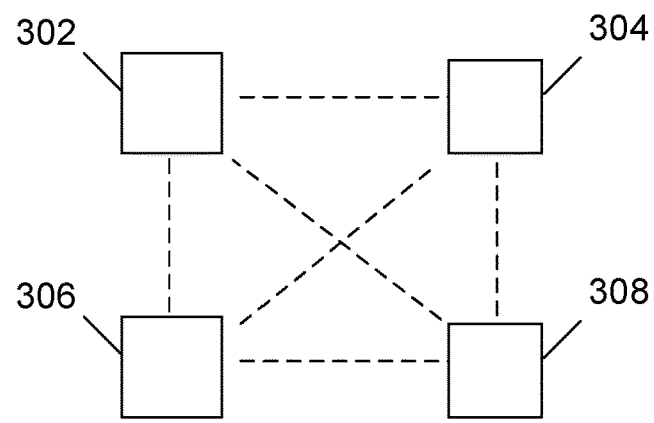
FIG. 3 shows a schematic of a sensor system according to further embodiments of the present invention.

A preferred embodiment of a sensor system as described above comprises at least 3 sensors or 4 sensors 302, 304, 306, 308 as shown in the sensor system 300 of FIG. 3 (generally the sensor system comprises many more sensors; features of the sensors as shown in FIG. 1 are omitted in FIG. 3 for clarity), and each sensor includes code to measure the distance to the other 2, 3, 4 or more sensors which it can "see" and to communicate this information with at least each of the other sensors it can "see". In the example of FIG. 3, each of sensors 302, 304, 306 and 308 "sees" all of the other sensors of the sensor system 300. However, in some embodiments, not all sensors "see" all of the other sensors. In this way a sensor in a triangle of 3 sensors with vertices of the sensors it knows the side lengths of the triangle. Thus each sensor in a triangle of sensors is able to determine the relative locations of all the sensors in the triangle. The skilled person will recognise that this can be extended to larger groups of sensors, for example 4, 5, 6, 7 or more sensors.

A set of three distances between three sensors is sufficient to define a triangle in a plane and in many sensor arrangements planes of sensors can be defined—for example rings of sensors in a tunnel.

Figure 4:
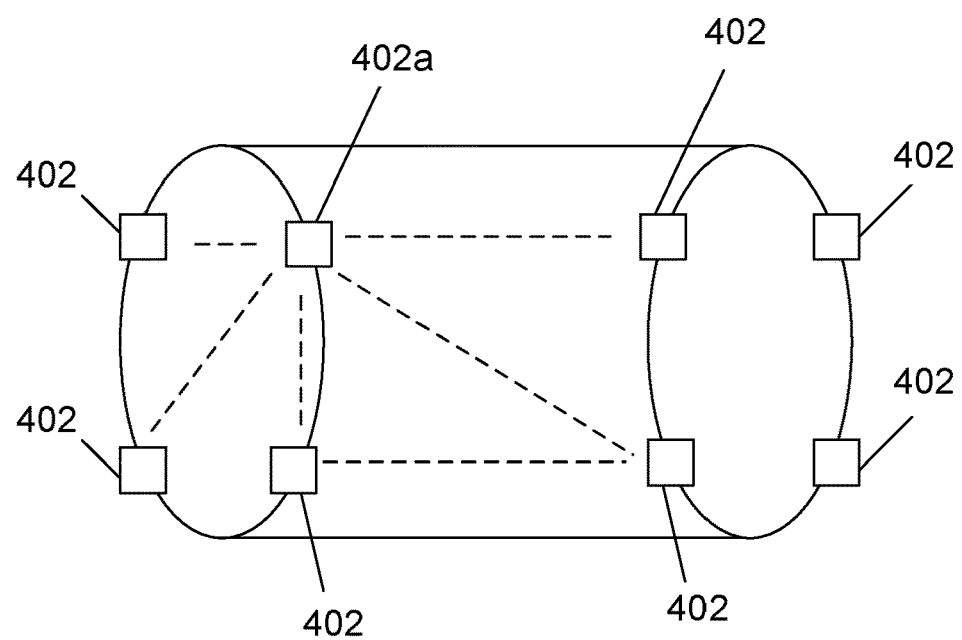
FIG. 4 shows a schematic of a tunnel with sensors employed in a system according to embodiments of the present invention.

FIG. 4 shows a tunnel 400 in which rings of sensors 402 are employed. In this example, sensor 402*a* "sees" the sensors which are on the same cross-section of the tunnel 400 and sensors on another cross-section which are closest to sensor 402*a*. With four (or more) sensor nodes location can be extended to 3 dimensions. In general, however, the more sets of distances from a sensor to neighbouring sensor nodes that can be defined, the better. In embodiments of the sensor system each sensor has its own identifier; in one embodiment this comprised a packet header more particularly an IPv6 header; a sensor node may have a name and/or number. The skilled person will appreciate that in this way an individual sensor can determine distances and directions between itself and the neighbouring sensors; a direction may be measured with reference to a common or shared 3D coordinate system.

In some preferred embodiments a sensor is also able to determine the distance to a second sensor based upon a received signal strength indication (RSSI). This may either be the signal strength of the second sensor as seen by the first, or vice versa, or both, the skilled person will know that typically received signal strength is extremely noisy, often varying by several orders of magnitude and sensitive to movement, reflections and light. Nonetheless the inventor has found, very surprisingly, that signal strength may be employed for determining a distance to better than 10 mm or better than 1 mm by averaging over a very long time period, for example greater than 1 day, 5 days or 7 days. As the skilled person will recognise, received signal strength can be converted into an absolute distance using a path loss equation, but this does not necessarily provide an accurate measure of absolute distance. Instead, therefore, in embodiments the distance as measured by received signal strength is employed in determining distance measure by signal timing as previously described. Thus in some embodiments a change in distance as measured by signal strength may be used to wake up another portion of the sensor and/or to activate the code for determining distance based on timing. Additionally or alternatively the distance measured by signal strength may be used to validate a distance measured by timing, for example checking that the timing distance is within reasonable/expected bounds as determined by the RSSI distance. In embodiments in addition to averaging over long periods the signal strength data may optionally be filtered in other ways.

In principle the distance between sensor nodes may be determined based on received signal strength without employing round-trip timing or one-way timing).

Figure 5:
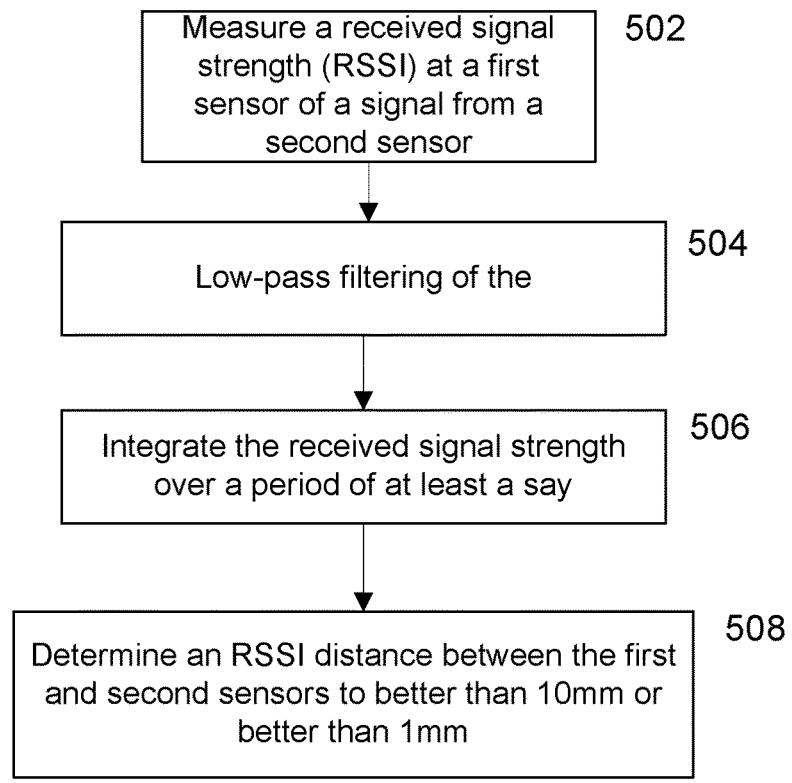
FIG. 5 shows a flowchart for determining an RSSI distance between two sensors according to embodiments of the present invention.

Thus the invention also provides a sensor system for measuring relative distance between sensors of the system, the sensor system comprising at least two sensors, wherein each said sensor comprises an RF transceiver coupled to a microprocessor, and stored program code for controlling the microprocessor. As shown in FIG. 5, the stored program code comprises code to: measure a received signal strength (RSSI) of a signal from said second sensor (step 502); and integrate said received signal strength over a period of at least a day (step 506) to determine an RSSI distance to said second sensor to better than 10 mm or better than 1 mm (step 508). In this example additional low pass filtering of the RSSI data, which is optional, may be employed at step 504.

In embodiments a distance between two sensors, either using the above described method or without such long-term integration (although shorter-term integration/averaging will generally be employed), may employ a path loss model to determine a change in distance between two sensors based on a change in RSSI. Then the path loss model may be selected according to the environment or location of the sensor(s)—for example a free space path loss model may be employed for sensors which are relatively distance from one another and a second (short-distance) model may be employed for sensors which are closer to one another. The model employed may be manually set at installation of the sensors, for example selected programmed into a particular sensor, or the model to use may be determined by the system, for example based on a determined distance between sensors or by seeking to achieve a self-consistent set of (measured) distances between sensors, or based on measured signal strength (using a first model for a weak propagation path and a second model for a strong propagation path).

For example the radio channel loss in a presumed free space signal propagation region—or equivalently the extreme far region—can be modeled by a free space model:

$$L_{R_{FS}}(\text{dB}) = -10\text{Log}_{10}\left[\frac{\lambda^2}{(4\pi)^2|z_r - z_t|^2}\right]$$

Where $L_{R_{FS}}$ is the signal propagation loss in free region, $|z_r - z_t|$ is the distance between the transmitter of the signal and the receiver of the signal and $\lambda$ is the signal wavelength.

In a stronger signal (close area signal propagation region) the following model may be employed:

$$L_{R_{CS}} = \frac{PL_1 - (NL_{Max} + PL_0)}{l_{close}}|z_r - z_t| + (NL_{Max} + PL_0) + X_\sigma$$

where $L_{R_{CS}}$ is the loss of signal (in the "close area"); $|z_r - z_t|$ is the distance between the transmitter of the signal and the receiver of the signal; $PL_1$ is a reference path loss between first and second reference points (for example between points at each end of the length of a tunnel bridge, building, vehicle or the like); $l_{close}$ is half the distance between the reference points; $PL_0$ is the path loss under a line of sight condition when the distance between transmitter and receiver is 0 meters (this may be calculated by the free space signal propagation method); $X_\sigma$ is a log-normal distribution, where $\sigma$ is the standard deviation; and where $NL_{Max}$ is a defined or chosen maximum path loss for the close area propagation model.

When instrumenting a structure, for example a tunnel, preferably the sensors are arranged so that they have line of sight with one another, or at least that groups of sensors have line of sight with one another. For example in a tunnel the sensors may be arranged in rings, each ring defining a plane, one mode of a ring connecting to a sensor in a second ring. This is not essential but facilitates determination of a distance between sensors based on a path loss equation. The skilled person will appreciate that there are several versions of path loss equation and any convenient may be employed. One example is given below:

$$RSSI - RSSI_{cal} = 10 \cdot n \cdot \log\left(\frac{d}{d_{cal}}\right)$$

where $d_{cal}$ is a known calibration distance for a calibration $RSSI_{cal}$ and n is approximately 2.

In another example, $$P_r(d) = P_r(d_o) - 10 * \alpha * \log\left(\frac{d}{d_o}\right) + X_\sigma$$

$$\alpha = \frac{-\sum_{i=1}^{n}(P_r(d_i) - P_r(d_o))}{\sum_{i=1}^{n} 10\log(d_i)}$$

where $P_r(d)$ is the received power of the positioning node sensor, $P_r(d_o)$ is the received power of the beacon node sensor (which in embodiments has a known distance from the base station ($d_o$)); $X_\sigma$ is the shadow fading effect, which is a Gaussian random variable with mean equal to zero and standard deviation equal to $\sigma$. This may be used to find an attenuation value for n measurements across an RF link between two sensors and then used to find a distance, for example between the base station and the sensor.

As previously mentioned, in embodiments signal strength measurements are averaged over a long period, for example greater than one day or one week (in embodiments a time of greater than three weeks was employed with 100 measurements per hour). With sensors spaced at less than 15 meters this has been experimentally determined to give distance accuracy to better than 1 mm or 0.1 mm, in example measurements of order 1 μm. Without such averaging the distance is only accurate to meters. Optionally additional low pass filtering of the RSSI data can be employed, as shown in FIG. 5.

In some preferred embodiments a sensor system as described above is implemented in the form of a mesh network in which each of a plurality of sensor nodes is configured to measure a relative distance to a plurality of neighbouring sensor nodes. In such a mesh network each node may maintain a table of relative distances between the node and the neighbouring nodes. Preferably whenever a change in relative distance between a node and one or more of the neighbouring nodes is identified this change is communicated to each of the neighbouring nodes concerned. In embodiments the complete table of relative distances is communicated with each of the other nodes concerned. As previously mentioned in embodiments each node has an associated node identifier (126, 128 in FIG. 1).

In a network of nodes one or more of the sensors may also be provided with an accelerometer and/or inclinometer (see items 130 and 132 in FIG. 1) which can be used, for example, to check/confirm that other distance data derived from timing and/or signal strength is correct. For example many or substantially all the sensors may include an accelerometer/inclinometer and then if a distance measured by signal strength does not match a distance determined by node-to-node signal timing, to within better than a threshold, then the distance may be checked with an accelerometer or inclinometer.

The above described techniques are particularly suitable for detecting very slow movements over long periods of time, of the type which are encountered in civil engineering such as tunnels. For this type of very slow movement determining distance from accelerometer measurements does not work well. However in embodiments of a sensor/ the sensor system a sensor may include an accelerometer, and where there is rapid or sudden movement accelerometer data may then be used instead of or to supplement distance data derived as previously described.

Thus

Velocity=∫Acceleration dt

Distance=∫∫Acceleration dt

In embodiments the integration is performed numerically by dividing the time domain of the acceleration data into small steps and then finding the area within each step. The resolution of the integration depends on the size of the steps, and as the step size gets smaller, the results gets more accurate.

The integration can be made, for example, using one of the three following numerical integration methods.

$$1 - \int_a^b f(x)dx \approx h\sum_{n=0}^{N-1} f(x_n)$$

where N is the number of the steps, h is the step size h=(b−a)/N and $x_n$ is the top left edge of the step n, $x_n$=a+nh.

This assumes that the top of each step is flat. Another method assumes the top of each step may slope:

$$2 - \int_a^b f(x)dx \approx \frac{h}{2}\sum_{k=1}^{N}(f(x_{k+1}) + f(x_k)) =$$

$$\frac{b-a}{2N}(f(x_1) + 2f(x_2) + 2f(x_3) + \ldots + 2f(x_N) + f(x_{N+1}))$$

A further, more accurate method assumes that the top of each step may curve:

$$3 - \int_a^b f(x)dx \approx \frac{b-a}{6}\left[f(a) + 4f\left(\frac{a+b}{2}\right) + f(b)\right] \quad (5)$$

An illustrative example of using the second method of the integration with time domain is shown below. Assume $a_i$, $v_i$ and $d_i$ are acceleration, velocity and displacement respectively, and that $\Delta t$ is the sampling interval and it is equal to $$\frac{1}{\text{sampling frequency}}.$$

Then $$v_i = v_{i-1} + \frac{a_{i-1} + a_i}{2}\Delta t$$

And the relative displacement of the ith segment can be written:

$$\Delta d_i = d_i - d_{i-1} = v_i\Delta t = v_{i-1}\Delta t + \frac{a_{i-1} + a_i}{2}\Delta t^2$$

To calculate the displacement of Nth time the displacement can be written as follows:

$$d_N = \sum_{i=1}^{N} v_{i-1}\Delta t + \sum_{i=1}^{N} \frac{a_{i-1} + a_i}{2}\Delta t^2$$

$$= \sum_{i=1}^{N} v_1\Delta t + \sum_{i=1}^{N}\left[\frac{a_1 + a_2}{2} + \frac{a_2 + a_3}{2} + \ldots + \frac{a_{i-1} + a_i}{2}\right]\Delta t^2$$

$$= N \times v_o \times \Delta t + \sum_{i=1}^{N}\left[\frac{a_0 + a_i}{2} + \sum_{j=1}^{N} a_j\right]\Delta t^2$$

In some preferred embodiments of the system, to reduce the overall power consumption one type of distance measurement, in particular a received signal strength-based measurement, can be used to identify when there is greater than a threshold change in distance and this can then be used to trigger a second, preferably more accurate measurement, for example a distance measurement based on timing. Such an approach may be implemented using a state machine. An approach of this type can, however, be extended.

Figure 6:
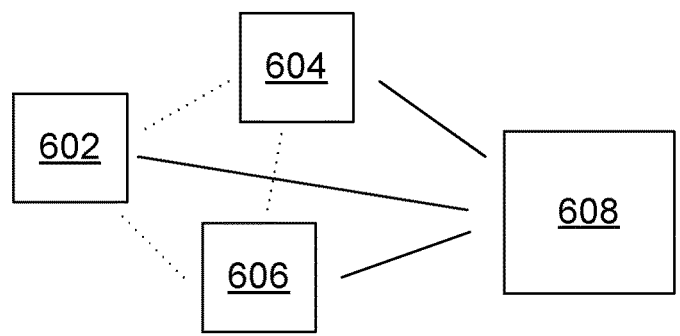
FIG. 6 shows a base station and sensors according to embodiments of the present invention.

In embodiments of the sensor system one or more gateways are provided to allow access to the data within the network of sensors. As shown in the sensor system 600 of FIG. 6, such a gateway may comprise, for example, a base station 608 serving a network of sensors 602, 604, 608. The network may be a star network, a mesh network, an adaptive network or some other type of network. Typically in such a system when a change in distance, that is relative motion of a sensor node, is identified the sensor will report to the base station/gateway, as indicated via the continuous lines in FIG. 6. However radio frequency transmission of data can be one of the most significant elements of power consumption in a system as described above. Thus a detected change in distance between one node and a neighbouring node may be employed to predict a potential change in distance between one or more other nodes. With an approach of this type the number and/or frequency of nodes making distance determinations can be reduced if, when one change in distance is determined, others are afterwards identified.

Thus in embodiments of the systems described above the sensors are grouped in families. In one implementation each family comprises a group of sensors defining a geometric plane; preferably each sensor is a member of only one family. When motion is detected by one or more sensors in one family this is then used to trigger determination of distance data between sensors, for example based on timing, in a second family.

In embodiments within a family, nodes may both talk and listen to one another. For example if a first node, say N1, identifies a change in its distance to a second node, N2 in the family it may then alert other nodes in the family to check their intra-family node distances (for example checking/updating their respective distance tables). Preferably a node tells one or more other nodes in the family of all the changes in distance it has identified; preferably a node reports one or more of the changes in distance it has identified to each node to which a distance has changed. If a node identifies changes in two or more of its distances to other neighbouring nodes then preferably it provides its full table of distances (in embodiments a table of distances between all pairs of nodes in the family) to the other nodes in the family.

In embodiments a node receiving change-of-distance data may perform different actions depending upon the number of inter-node distances which have changed; if, say a third node N3 receives data from a first node N1 defining that just one inter-node distance has changed, say the N1-N2 distance then node N3 can infer that the second node N2 has moved and can thus update its own distance to node N2. If a node moves its distances to all the other nodes in the family will change; if a node only sees one distance change, say if node N1 sees the N1-N2 distance change, then N2 rather than N1 must have moved. In embodiments if a node, say N2, receives two or more distance change updates then node N1 has moved and all distances to N1 within the family can be updated.

Thus, for example, if N1 reports two or more changes to the other nodes in the family each of the other nodes may update their distance to N1 (optionally taking an average of the distance they measure and that reported by N1). If N1 reports only one distance change, to say node N2, then the receiving node N2 updates its distances to all the other nodes in the family.

Figure 7:
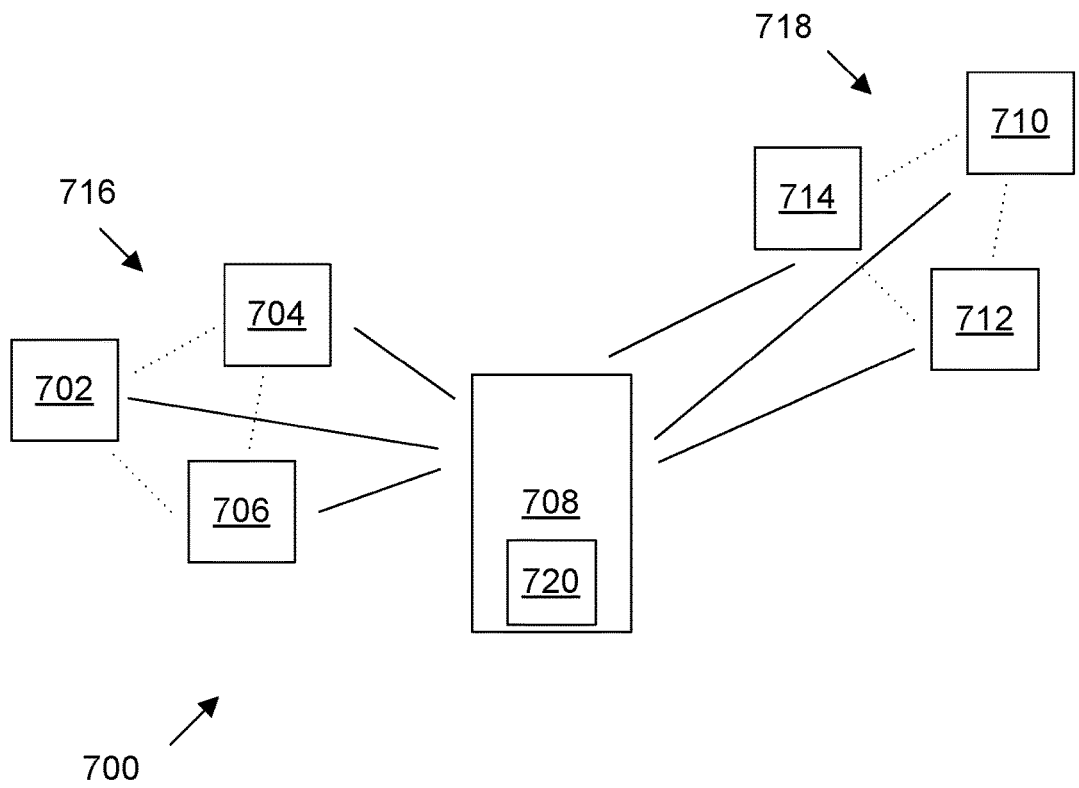
FIG. 7 shows a sensor system according to further embodiments of the present invention.

This approach may be extended to determine which node or nodes report distance changes to the gateway or base station. In the sensor system 700 of FIG. 7, nodes 702, 704 and 706 are in a first family 716. Nodes 710, 712 and 714 are in a second family 718. In this example of the sensor system 700, data is held defining the distances between all the pairs of nodes in each family. This information may be held in the gateway/base station (for example in memory 720) or elsewhere. More particularly in embodiments a copy of the distance table of each sensor of the network is stored, either at the gateway/base station or elsewhere. Where, as described above, a node identifies that its position has changed then that may be the only node to report back to the gateway/base station. Alternatively one node within a family may be designated as a master node. In this latter arrangement each node may maintain a full table of all the distances between pairs of nodes within a family. This is straightforward with the above described procedure in which a node provides its complete distance table to all the other nodes concerned if two or more distance changes are identified.

In a system as described above an individual node may measure distances to other nodes in the family relatively infrequently, for example at intervals of once per hour or longer. Each node may maintain a distance table, for example defining distances Ni-Nj where j runs over all the nodes within a family expect for node Ni, and where the distance information may be held either in the form of physical length data say in mm, or in terms of signal transit time or round-trip time data or in some other form representing distance. Nodes within different families may communicate with one another, for example to communicate data backs to the gateway/base station in, say, a mesh network arrangement. Optionally detected relative motion of a node within one family may be employed to alert a second family so that one or more measurements can be made within that family. Additionally or alternatively a procedure as described above for determining relative positions within a family may be employed to determine relative positions of families of sensors—for example detected motion of one family with respect to another may be employed to trigger one or more further measurements of relative distances between sensors in different families, thus, in effect, a change in distance between two families may be used to trigger measurement of relative position of one or more other families with respect to one or both of the initial two families.

These approaches are advantageous in practice because of the way structures tend to move: consider the example of a tunnel with families comprising rings of sensors defining transverse planes at intervals along the length of the tunnel. Within ring sensors tend to move together; over time collective motion of one ring of sensors is likely to be followed by collective motion of a second ring of sensors further down the tunnel later. The same general principle applies to other types of civil engineering structure.

Figure 8:
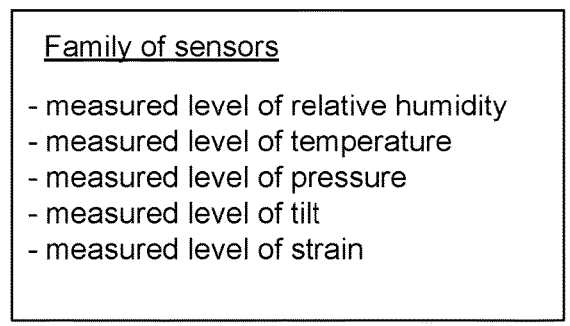
FIG. 8 shows a diagram of how a family of sensors is determined according to embodiments of the present invention.

The above described grouping of sensors into families may be employed independently of the measurement of inter-sensor distance by timing and/or received signal strength. Further, the concept of families may be generalised so that, for example, a family of sensors may be defined as a group of sensors with one or more sensed values or parameters which are common to the sensors within the family (within a threshold). Thus although a family of sensors may be defined, say, by the sensors lying in a common plane, additionally or alternatively, as shown in the diagram of FIG. 8, a family of sensors may be defined by a measured level of relative humidity, and measured level of temperature, a measured level of pressure, a measured level of tilt, a measured level of strain and the like. Optionally two or more parameters may be required to match (within a tolerance). The same general principles may then be employed to identify which sensors within a family change together; again tables of sensed values for the sensors within a family may be maintained, and again the reporting to the gateway or base station may be managed so that, for example, only one sensor need report depending on the changes identified. As before an individual sensor's frequency of sensing may be reduced where one sensor is able to alert or wake up other sensors within the family to take measurements when needed.

In embodiments of the above described family-based systems, groups of sensors may additionally have the ability to subdivide a family based on an identification that the sensors in the family no longer share a common parameter—for example because some of the sensors have moved out of their common plane. Correspondingly, where sensors are identified as moving together, they may be combined into a family.

Thus the invention also provides a sensor mesh network, in particular comprising a sensor system as described above, the sensor mesh network comprising a plurality of sensor nodes each configured to measure a relative distance to a plurality of neighbouring sensor nodes; wherein said sensor nodes define a set of sensor families wherein each family comprises a plurality of said sensor nodes; wherein each sensor node is configured to measure a plurality of sensed variables; wherein within a family said sensor nodes all have at least one characteristic sensed variable value in common; and wherein said sensor nodes are collectively configured such that a measurement of a change in one or more of the sensed variable values in one family prompts check for a change in one or more corresponding sensed variable values in a second family.

As previously mentioned in embodiments the families of sensors may define successive planes of sensors or may be defined in some other way.

The invention further provides a method of measuring relative distance between sensors of sensor system, the sensor system comprising at least two sensors, wherein each said sensor comprises an RF transceiver coupled to a microprocessor, and stored program code for controlling the microprocessor, the method comprising: determining a distance between two said sensors by using the microprocessors and RF transceivers of the sensors to exchange messages between the sensors, compensating for a processing time of the microprocessor in one of the sensors in exchanging said messages.

The invention still further provides a sensor comprising one or more of the features/stored program code described above, for example, comprising an RF transceiver coupled to a microprocessor and stored program code for sending a group of one or more data bits, receiving a response, and determining a distance to a second sensor from the timing of the sending and response. Additionally or alternatively the sensor may incorporate a system/stored program code for determining a distance to a second sensor based on signal strength. Still further additionally or alternatively the sensor may include a system, for example implemented in stored program code, to identify a change in distance between the sensor and one or more additional sensors and to update a set of distances and/or report to a gateway and/or base station accordingly.

Embodiments of a sensor system/network/method as described above may also employ an air temperature to adjust or compensate distance determined by the system: the propagation time of a signal is modified slightly by air temperature. The air temperature is preferably measured (but may be predicted or taken from an external data feed), for example by a temperature sensor associated with one or more of the sensors or the network. The distance modification or compensation may be determined, for example, by calibration data stored in a calibration data table; the calibration data may be determined by experiment.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:
   send, using said RF transceiver, a group of one or more data bits from the sensor to a second sensor;
   receive, using said RF transceiver, an acknowledgement of reception of said group of data bits from said second sensor;
   determine a time difference between said sending and said receiving; and
   compensate said time difference for a processing delay by the microprocessor of said second sensor between the second sensor receiving said group of data bits and sending said acknowledgement, to determine timing data representing a distance to said second sensor,
   wherein said stored program code further comprises code to:
   read a second said group of one or more data bits received from said second sensor;
   operate on said second group of data bits with one or more instructions of said microprocessor; and
   send a second acknowledgement signal to said second sensor.

2. A sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:
   send, using said RF transceiver, a group of one or more data bits from the sensor to a second sensor;
   receive, using said RF transceiver, an acknowledgement of reception of said group of data bits from said second sensor;
   determine a time difference between said sending and said receiving; and
   compensate said time difference for a processing delay by the microprocessor of said second sensor between the second sensor receiving said group of data bits and sending said acknowledgement, to determine timing data representing a distance to said second sensor,
   wherein said stored program code further comprises code to:
   send a plurality of said groups of data bits to said second sensor, wherein said plurality of said groups of data bits comprises groups of data bits of different lengths.

3. A sensor system as claimed in claim 2 wherein said plurality of said groups of data bits comprises groups of data bits comprising two or more of:
   a bit, a byte, a word, and a long word.

4. A sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:
   send, using said RF transceiver, a group of one or more data bits from the sensor to a second sensor;
   receive, using said RF transceiver, an acknowledgement of reception of said group of data bits from said second sensor;
   determine a time difference between said sending and said receiving; and
   compensate said time difference for a processing delay by the microprocessor of said second sensor between the second sensor receiving said group of data bits and sending said acknowledgement, to determine timing data representing a distance to said second sensor,
   wherein said stored program code further comprises code to:
   send successive said groups of data bits to said second sensor; and
   determine timing distance data representing an average distance to said second sensor from time differences for successive sendings of said group of data bits and receiving of respective said acknowledgements.

5. A sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:
   send, using said RF transceiver, a group of one or more data bits from the sensor to a second sensor;
   receive, using said RF transceiver, an acknowledgement of reception of said group of data bits from said second sensor;
   determine a time difference between said sending and said receiving; and
   compensate said time difference for a processing delay by the microprocessor of said second sensor between the second sensor receiving said group of data bits and sending said acknowledgement, to determine timing data representing a distance to said second sensor,
   wherein for each said sensor:
   said RF transceiver includes at least one RF transmitter and at least two RF receivers;
   the sensor is configured to determine a phase difference between signals received at the two RF receivers; and
   said stored program code comprises code to:
   determine a change in said phase difference and to determine a change in separation of the sensor from another said sensor from said change in phase difference.

6. A sensor system for measuring relative distance between sensors of the system, the sensor system comprising at least three sensors, wherein each said sensor comprises an RF transceiver coupled to a microprocessor, and stored program code for controlling the microprocessor, wherein said stored program code comprises code to:
   send, using said RF transceiver, a group of one or more data bits from the sensor to a second sensor;
   receive, using said RF transceiver, an acknowledgement of reception of said group of data bits from said second sensor;
   determine a time difference between said sending and said receiving; and
   compensate said time difference for a processing delay by the microprocessor of said second sensor between the second sensor receiving said group of data bits and sending said acknowledgement, to determine timing data representing a distance to said second sensor,
   wherein said stored program code further comprises code to:

communicate said distance data to other nodes of said sensor system; and identify relative locations in a plane of said three sensors from said timing distance data and corresponding said distance data received from other sensors in said sensor system.

7. A sensor system as claimed in claim 1 wherein said stored program code further comprises code to:

measure a received signal strength (RSSI) of a signal from said second sensor;

integrate said received signal strength over a period of at least a day to determine an RSSI distance to said second sensor to better than 10 mm or better than 1 mm;

use said RSSI distance for determining said timing distance data.

8. A mesh sensor network, comprising a sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:

send, using said RF transceiver, a group of one or more data bits from the sensor to a second sensor;

receive, using said RF transceiver, an acknowledgement of reception of said croup of data bits from said second sensor;

determine a time difference between said sending and said receiving; and compensate said time difference for a processing delay by the microprocessor of said second sensor between the second sensor receiving said croup of data bits and sending said acknowledgement, to determine timing data representing a distance to said second sensor, the mesh sensor network further comprising a plurality of sensor nodes each configured to measure a relative distance to a plurality of neighbouring sensor nodes;

wherein each node is configured to:

identify a change in relative distance to one or more of the nodes;

communicate said change to each of the other nodes for which said change is identified; and on receipt of communication of a said change from another node update a table of relative distances between the node and the other nodes.

9. A mesh sensor system as claimed in claim 8 wherein each node is further configured to:

determine when said relative distance to more than one of the other nodes has changed; and in response communicate said table of relative distances between the node and the other nodes to each of the other nodes.

10. A sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:

send, using said RF transceiver, a group of one or more data bits from the sensor to a second sensor;

receive, using said RF transceiver, an acknowledgement of reception of said group of data bits from said second sensor;

determine a time difference between said sending and said receiving; and compensate said time difference for a processing delay by the microprocessor of said second sensor between the second sensor receiving said group of data bits and sending said acknowledgement, to determine timing data representing a distance to said second sensor, wherein said sensors are grouped in families, each said family comprising a group of sensors a plane, and wherein detected motion in one said family triggers determination of timing distance data in a second said family, wherein said timing distance data is based on a transition time of a signal between two sensors.

11. A sensor mesh network comprising a sensor system for measuring relative distance between sensors of the system, the sensor system comprising at least two sensors, wherein each said sensor comprises an RF transceiver coupled to a microprocessor, and stored program code for controlling the microprocessor, wherein said stored program code comprises code to:

send, using said RF transceiver, a group of one or more data bits from the sensor to a second sensor;

receive, using said RF transceiver, an acknowledgement of reception of said group of data bits from said second sensor;

determine a time difference between said sending and said receiving; and compensate said time difference for a processing delay by the microprocessor of said second sensor between the second sensor receiving said group of data bits and sending said acknowledgement, to determine timing data representing a distance to said second sensor, the sensor mesh network further comprising a plurality of sensor nodes each configured to measure a relative distance to a plurality of neighbouring sensor nodes;

wherein said sensor nodes define a set of sensor families wherein each family comprises a plurality of said sensor nodes;

wherein each sensor node is configured to measure a plurality of sensed variables;

wherein within a family said sensor nodes all have at least one characteristic sensed variable value in common; and wherein said sensor nodes are collectively configured such that a measurement of a change in one or more of the sensed variable values in one family prompts check for a change in one or more corresponding sensed variable values in a second family.

12. A network as claimed in claim 11 wherein said measurement of a change in one or more of the sensed variable values in one family which prompts a check for a change in one or more corresponding sensed variable values in a second family comprises a measurement of a change in said a characteristic sensed variable value.

13. A network as claimed in claim 11 wherein said families of sensors define successive physical planes of sensors.

* * * * *